United States Patent

[11] 3,566,726

| | | |
|---|---|---|
| [72] | Inventor | George A. Politis<br>Coatesville, Pa. |
| [21] | Appl. No. | 736,805 |
| [22] | Filed | June 13, 1968 |
| [45] | Patented | Mar. 2, 1971 |
| [73] | Assignee | The Pantasote Company of New York Inc.<br>New York, N.Y. |

[54] METHOD OF MAKING PERFORATED FILM
7 Claims, 5 Drawing Figs.

[52] U.S. Cl. .................................................. 83/15,
83/170, 83/547, 83/660, 264/156, 264/280,
264/322
[51] Int. Cl. .................................................... B26d 7/10
[50] Field of Search........................................ 83/547,
170, 171, 660, 15, 16; 264/156, 280, 322

[56] References Cited
UNITED STATES PATENTS

| 2,647,065 | 7/1953 | Scholl............................ | 264/156X |
| 2,748,863 | 6/1956 | Benton.......................... | 83/171 |
| 3,161,554 | 12/1964 | Blackford...................... | 83/171X |

FOREIGN PATENTS

| 64,783 | 6/1955 | France .......................... | 264/156 |

*Primary Examiner*—James M. Meister
*Attorney*—Medert & TE Grotenhuis

ABSTRACT: Unsupported thermoplastic films having elastic memory are perforated and/or embossed and perforated while heated to a plastic temperature by feeding the film, while heated to a temperature where it is plastic, together with a suitable web, such as a release paper, into the bite between a perforating (and/or perforating and embossing) roll and a backing roll, so that during the perforating the film is pressed against the web and the pins of the perforating roll enter at least partway into the web. After cooling the web is removed. The material from the perforations is caused to flow into the balance of the film, thickening and reinforcing the same instead of being punched out and lost as is the case when a cold nonplastic film is perforated.

Patented March 2, 1971
3,566,726
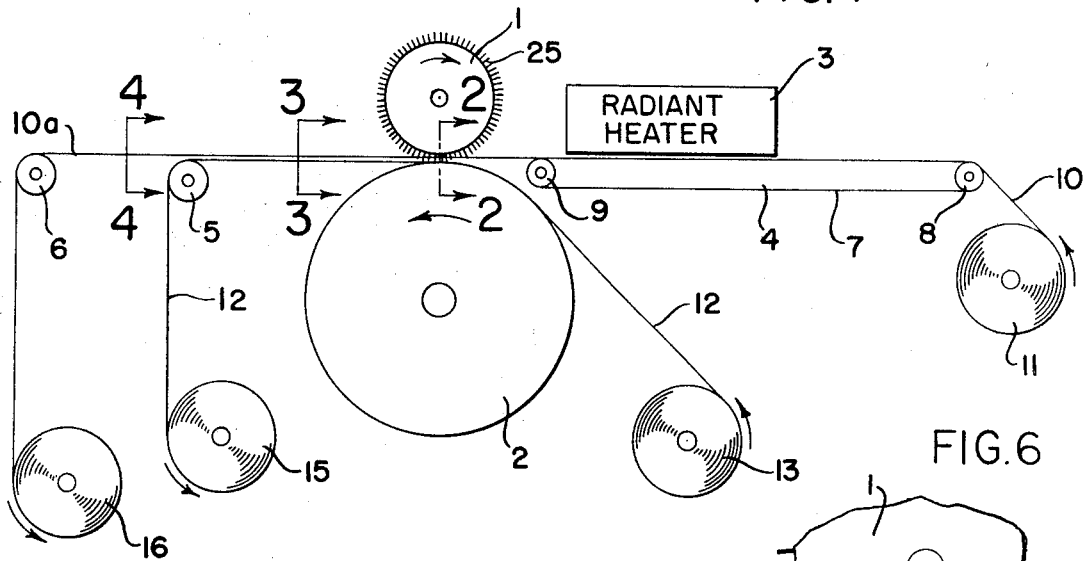
FIG. 1
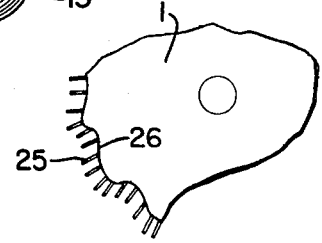
FIG. 6
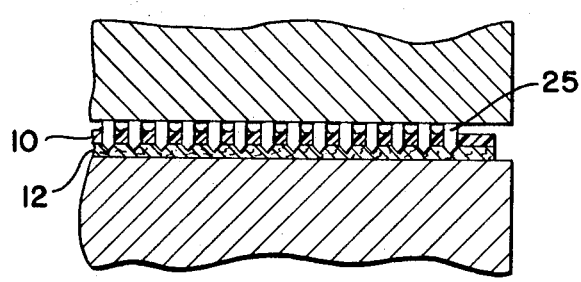
FIG. 2
FIG. 3
FIG. 5
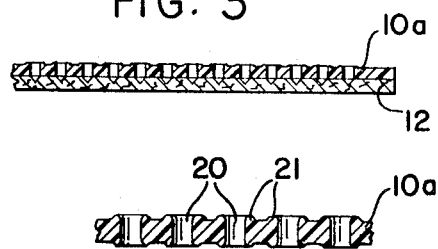
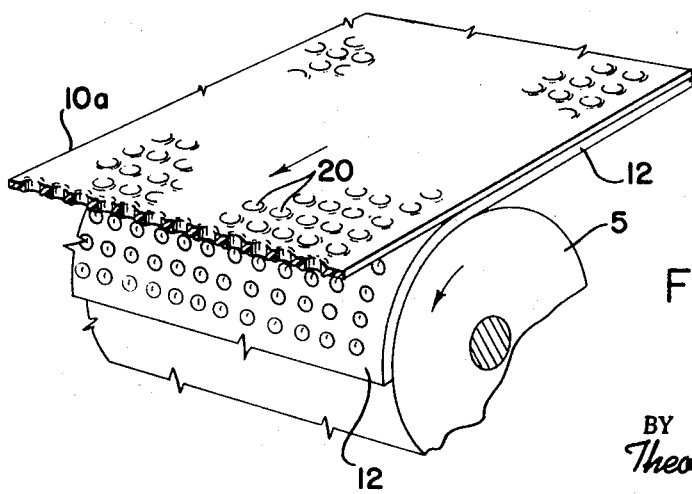
FIG. 4
INVENTOR.
GEORGE A. POLITIS
BY
Theodore A. TeGrotenhuis
ATTORNEY

METHOD OF MAKING PERFORATED FILM

The present invention relates to a method of embossing and perforating unsupported thermoplastic films, such as films composed of polyvinyl chloride and the like.

Conventional methods of embossing and perforation are limited to supported films because the heated film cannot be perforated without a backing material which provides a firm bite for the perforating pins. The backing material is generally a lightweight fabric of the woven or nonwoven variety that is bonded firmly to the film. Unsupported films without any bonded backing cannot be perforated and embossed by conventional embossing and perforating processes because when the film is sufficiently softened for embossing purposes, the holes formed by the perforating pins or perforating means close by the elastic memory inherent in the material. While perforation of an unsupported embossed film can of course be made after embossing while the film is cold, such greatly adds to cost and is therefore seldom accomplished. Also when a cold film is perforated the material of the openings is punched out and lost leaving sharp edges which cause increased cracking of the film and loss of strength. On the other hand perforation of a hot plastic merely spreads the material thickening the edges of the openings with resultant improved properties.

It is an object of the present invention to provide a method of embossing and perforating unsupported thermoplastic film, and particularly unsupported plasticized polyvinyl chloride which does not have a backing bonded thereto.

It is another object of the present invention to provide a perforated or preferably a perforated and embossed polyvinyl chloride filmlike material which does not carry a backing of any type and which has perforations with the thickened periphery characteristic of films perforated while plastic.

Other objects will be apparent from the following description of the invention as illustrated by the accompanying drawing, in which:

FIG. 1 is a schematic side elevational view of suitable apparatus for practice of the present invention showing therein a roll of a strip of thermoplastic filmlike material before and after the perforating step, and also showing a roll of a strip of removable web which provides a temporary backing during the perforating step;

FIG. 2 is a sectional view of a portion of the apparatus taken on the line 2–2 of FIG. 1;

FIG. 3 is a sectional view through the perforated thermoplastic film and the removable backing strip, taken on the line 3–3 of FIG. 1;

FIG. 4 is a sectional view through the perforated and embossed film taken on the line 4–4 of FIG. 1 showing the backing stripped therefrom and a portion of the roll as seen from the direction of the arrows 4–4 of FIG. 1;

FIG. 5 is an enlarged sectional view of the perforated film of the present invention showing the thickened walls of the openings; and FIG. 6 is a side elevational view of a portion of an embossing and perforating roll showing the embossing surface in enlarged form for purposes of illustration.

I have discovered that simultaneous embossing and perforation may be accomplished by separately heating thermoplastic film, such as polyvinyl chloride, to an embossing temperature wherein the film becomes plastic but still has elastic memory and then passing the plastic film between an embossing and perforating roll and a suitable backup or pad roll while it is simultaneously pressed in contact with an additional web of nonplastic material, which may be a suitable release paper, woven or nonwoven fabric and the like treated with a silicone or fluorocarbon etc. to prevent adhesion or to prevent appreciable adhesion to the film being embossed and perforated. After the embossed and perforated film has cooled to retain its embossed shape, the additional web is stripped therefrom, leaving the resultant embossed and perforated film. If no embossing is desirable but merely a perforated film having the perforations with the thickened peripheral walls that are characteristic of perforations made by forcing the material of the openings into the walls while the film is plastic then the contour of the basic roll surface is smooth except for perforating pins.

Referring more particularly to the drawing, wherein various components are designated by like numerals of reference throughout the several views, the embossing apparatus comprises a perforating or an embossing and perforating roll 1, a backup or pad roll 2, suitable heating means such for example as a radiant heater 3, suitable conveying means such as a conveyor for conveying the film to the bite between the perforating and backup rolls, suitable means for also supplying a removable web to the bite between the perforating and backup rolls and means for stripping the backing web from the perforated and embossed film. The perforating roll 1 has a suitable contour such as the embossing surface 26 schematically shown in FIG. 6 in an amplified scale, and perforating means such as the pins 25 around the periphery thereof.

In the practice of the invention, the film 10 to be embossed is supplied from the roll 11 over the conveying means 4, which latter comprises the continuous belt 7 and the rolls 8 and 9, under the radiant heater 3 to the bite between the suitably coiled metal embossing and perforating roll 1 and the backup or pad roll 2. A suitable web 12 of material such as suitable release paper is supplied from the roll 13, also to the bite between the perforating roll 1 and the backup roll 2. The web 12, as aforesaid, may be of paper or woven or nonwoven fabric suitably treated as by silicones or perfluoro compounds to prevent adhesion to the softened plastic film being perforated and embossed. It is supplied in contact with the backup roll so that it is pressed tightly between the backup roll against the softened film during the embossing and perforating process, whereupon it supports the heat-softened material during the perforation and/or perforating and embossing process. The web 12 when of paper, as is preferred, has a coating to prevent adhesion and to prevent absorption of liquid and since it has no elastic memory while it is in contact with the perforated film, it prevents the closing of the holes formed therein because of the elastic memory of the film. In the bite between the rolls 1 and 2 the embossing pins 25 pass entirely through the film 10 and part way into the backing web 12.

The web 12, together with the perforated or embossed and perforated film 10a, is passed over the roll 5, whereupon the web 12 is stripped from the embossed film 10a to form the roll 15, which may be discarded or rewound and reused. The embossed and perforated film 10a passes over the roll 6 to form the roll 16.

The perforated and/or embossed and perforated film has openings 20 with thickened peripheral portions 21 formed of material originally in the film where the openings are located.

It will be seen that the unsupported and perforated films of the present invention being reinforced in the area of the perforations have improved strength and resistance to flex cracking compared to films perforated cold.

It is also apparent that in accordance with the provisions of the patent statutes modifications of the invention may be made without changing the spirit thereof.

I claim:

1. A method of perforating unsupported thermoplastic film which comprises heating said thermoplastic film at a temperature at which it is plastic but at which it still has elastic memory, passing said thusly heated strip into the bite between a perforating roll and a backup roll, simultaneously passing a web of nonplastic material into the bite between said perforating roll and backup roll, said film being disposed between said web and said perforating roll and being in pressure contact with said web while in said bite, said perforating roll having perforating means extending into said web while in said bite and being at a temperature substantially below the temperature at which said film is plastic, maintaining said web in contact with said perforated film until said film has cooled below the plastic state, and then stripping the web from said perforated film, whereby said web prevents perforations in said film from closing due to elastic memory when said perforating means is withdrawn from said film.

2. The method of claim 1 wherein said perforating roll also has a contour suitable for embossing said film.

3. The method of claim 1 wherein said perforating roll is of metal and is unheated.

4. The method of claim 3 wherein said film is a compounded polyvinyl chloride.

5. The method of claim 3 wherein said web is a fibrous material suitably treated to prevent adhesion to said film when the latter is in the plastic state.

6. The method of claim 3 wherein said web is a suitable release paper.

7. A perforated and unsupported film of polyvinyl chloride having thickened peripheral wall portions immediately surrounding the perforations formed by flow of plastic material during the forming of said perforations.